Oct. 28, 1952 G. C. SZIKLAI ET AL 2,615,977

GAIN CONTROL CIRCUIT UTILIZING KEYED MAGNETIC AMPLIFIER

Filed May 28, 1948

INVENTORS
George C. Sziklai and
Francis J. Darke, Jr.
By [signature]
ATTORNEY

Patented Oct. 28, 1952 2,615,977

UNITED STATES PATENT OFFICE 2,615,977

GAIN CONTROL CIRCUIT UTILIZING KEYED MAGNETIC AMPLIFIER

George C. Sziklai and Francis J. Darke, Jr., Princeton, N. J., assignors to Radio Corporation of America, a corporation of Delaware Application May 28, 1948, Serial No. 29,797

5 Claims. (Cl. 178—7.3)

This invention relates to automatic gain control, and more particularly to circuit arrangements and methods for obtaining improved gain control in television sound broadcast, radar receivers, and the like.

Although it is not intended or expected that the practice of this invention will be limited to employment in television systems, it is believed that its employment in television receivers and the like will greatly improve their service and the invention will therefore be explained in this connection.

Automatic gain control of television receivers, while not absolutely essential, is even more important for improvement in service than the use of automatic gain control or automatic volume control in sound receivers.

The proper manual control of gain in television receivers and the like, because of its associated complexities, is generally difficult for non-technical personnel. The levels most desirable for proper reception of television signals are sometimes critical, since the limiter, synchronizing signal separator and direct current setter of the television receiver all depend for best performance upon the correct amplitudes being maintained. The tuning of a television receiver without automatic gain control often requires the readjustment of several controls due to different signal levels.

Furthermore, television signals suffer from violent fading due to passing airplanes. This can be reduced or eliminated only by an efficient automatic gain control circuit. The use of an automatic gain control in a television receiver may not only provide improved performance, but allow the simplification of portions of the receiver, such as the synchronizing signal separator, which should not normally be required to operate over wide ranges of amplitude.

It is also obviously undesirable to remove as many controls as possible from the receiver panel. Unlike sound receivers, the inclusion of an automatic gain control circuit in a television receiver would permit the removal of the light or image contrast control, and perhaps even the image background control. This may be explained by reason of the fact that the brilliance, contrast and background level for television systems is not generally subject to observers' individual desires, such as is constantly present in the manipulation of a sound receiver, where the desired volume may cover a wide range. Furthermore, it is believed that a maximum contrast and brightness is always desired under all conditions, while different levels of sound intensity are required under different ambient conditions such as noisy or quiet room, distance from sound receiver, etc.

In a radio or sound receiver, the signal which is measured and which is held constant by the automatic volume control is the average carrier level. This is easily measured, because the D.-C. output of the detector is proportional to the average carrier level.

In a television receiver, however, the automatic gain control must, for proper operation, hold constant the peak carrier level. This peak carrier level may be obtained by measuring the voltage of the peaks of the synchronizing pulses at the output of the second detector, provided that the load of the detector has the same D.-C. as video frequency impedance. The output of the measuring device is then fed back to the IF amplifier in such a way as to decrease the gain as the signal strength increases.

Amplification of the automatic gain control signal may be obtained by amplifying the signal before peak measurement or amplifying the D.-C. output of the peak measuring device, or both. In either case the amplification must be D.-C., and in the former case, it must also amplify video signals. The automatic gain control device for a television receiver must necessarily consist of some sort of signal detecting arrangement such as a diode feeding a capacitive element or the like. Since this circuit receives information only during the time interval of the synchronizing pulse, which is 8% of the time, the capacitor must hold its charge between synchronizing pulses.

A peak detector, when employed for television automatic gain control, is, of course, quite susceptible to peaks of noise or interference. The noise is predominantly in the black or increasing signal direction in accordance with present standards, and may be quite high as compared with the signal. The peak detector then measures the noise height, rather than the signal height, and may reduce the gain of the receiver to a small value, giving a very unsatisfactory performance under noise consideration, which may often be encountered in outlying or suburban areas.

An important method and arrangement for obtaining improved automatic gain control performance in the presence of noise has been proposed and operates by what is known as the keying principle.

A clamping circuit is shown and described in the U. S. patent to C. O. Browne et al., 2,190,753, dated September 14, 1935. Clamping as applied to automatic gain control is disclosed in the U. S.

patent to Alan D. Blumlein, 2,224,134, dated March 20, 1936. The subject of automatic gain controls for television receivers is well outlined in an article entitled "Automatic Gain Controls for Television Receivers" by Karl Wendt, published in the "RCA Review" for June 1948.

A keyed automatic gain control system is one which is turned on or made operative for only small intervals of time during the synchronizing pulses and usually less than 8% of the time. A narrow pulse occurring at, for example, horizontal frequency is used to key the automatic gain control circuit into operation for the duration of the narrow pulse. The pulse is usually obtained from the local horizontal oscillator, in which case synchronism must be established for proper operation.

Such methods and arrangements employing the keying principle have several fundamental advantages. If, for example, the pulse time is 5% of the total time, a theoretical advantage of 20 times in noise immunity is obtained since, for 95% of the time, noise cannot affect the automatic gain control circuit, although, practically speaking, this full gain is not obtained, since small noise pulses on a white signal do not affect a simple automatic gain control; nevertheless, a considerable gain can be realized. Furthermore, the vertical sync information is completely eliminated from the automatic gain control circuit, allowing it to be made as fast as desired without impairing vertical synchronization. Since the keyed automatic gain control may be independent from the vertical synchronization, the speed of response of the automatic gain control circuit may be made fast, and therefore the effects of rapid fading are not only reduced, but the receiver quickly recovers from any residual effects due to noise.

As has been outlined above, it is preferred to have television automatic gain control circuits of the keyed variety. That is, the information as to the output voltage is received only during short intervals of time because of the fact that, except for the inclusion of noise on the image signals, the automatic gain control circuit derives its energy from the synchronizing impulses. The control, however, must be made to apply continuously. The control voltage must therefore be integrated or stored. This involves filtering and delay. In order to obtain a maximum degree of control, it is necessary, of course, that the gain control voltage or energy be amplified. If the A.-C. gain of the automatic gain control circuit is too high, the circuit will oscillate. That is, the control voltage may be larger than needed, and at the next measurement or at the next succeeding impulse, an opposite correcting voltage may be received, and in such instant the system will oscillate. The gain of the system must be as low as possible for frequencies higher than approximately ⅓ of the keying or recurring rate of the synchronizing impulses. The gain below this frequency may be allowed to rise as rapidly as possible, but delay should be avoided.

The D.-C. gain of the automatic gain control circuit may be quite high without causing difficulties. The flatness of the automatic gain control circuit is determined generally by the D.-C. gain. If the D.-C. gain is too high, however, any low frequency delay, such as power supply filtering, may cause low frequency oscillation or "motor boating."

Heretofore the amplification in automatic gain control circuits has been accomplished with vacuum tubes which, generally speaking, are not the most ideally suited as direct current amplifier and have generally a frequency characteristic exactly opposite to the above described requirements.

According to the present invention, a magnetic amplifier utilizing a saturating reactor is included in a novel circuit arrangement for amplification of the D.-C. voltage derived from the rectified carrier.

The theory of operation and details of construction of the magnetic amplifier utilizing a saturating reactor are well described in the presently published literature, such as the article by Alan S. FitzGerald entitled "Some Notes on the Design of Magnetic Amplifiers," on pages 323–362 of "Electronics" for September 1947, and an article by W. E. Greene entitled "Applications of Magnetic Amplifiers" in the "Journal of the Franklin Institute" for November 1947 (pages 124–128). Although the articles referred to above clearly describe the magnetic amplifier, it is perhaps well here to briefly outline its operation.

A magnetic amplifier consists basically of a saturable reactance secondary winding with a primary wound in a manner such that no direct transformation is possible between the said primary and secondary, and a rectifier connected to the secondary winding provides a D.-C. voltage which is inversely proportional to the reactance of the secondary winding.

It has been found that with comparatively small changes in the primary voltage or current, a very large variation in the secondary voltage may be obtained. If the transformer is properly biased to operate on the saturating reactor principle, very large variations in the secondary voltage may be obtained. If, for example, a direct current is applied to one winding of the transformer in such a manner as to control its reactance due to its core saturating effect, large changes in secondary impedance may be obtained. If, therefore, an alternating current is applied to the secondary of the transformer and rectified, the direct current voltage obtained from the rectification varies in accordance with the changes in primary current. Large direct current voltage amplifications can be obtained in this manner.

A primary object of this invention is therefore to provide improved automatic gain control circuits.

Another object of this invention is to improve automatic gain control in television receivers and the like.

Still another object of this invention is to make it possible to omit contrast and background controls in television receivers.

Other and incidental objects of the invention will be apparent to those skilled in the art from a reading of the following specification and an inspection of the accompanying drawing in which.

Figures 1, 2, 3:
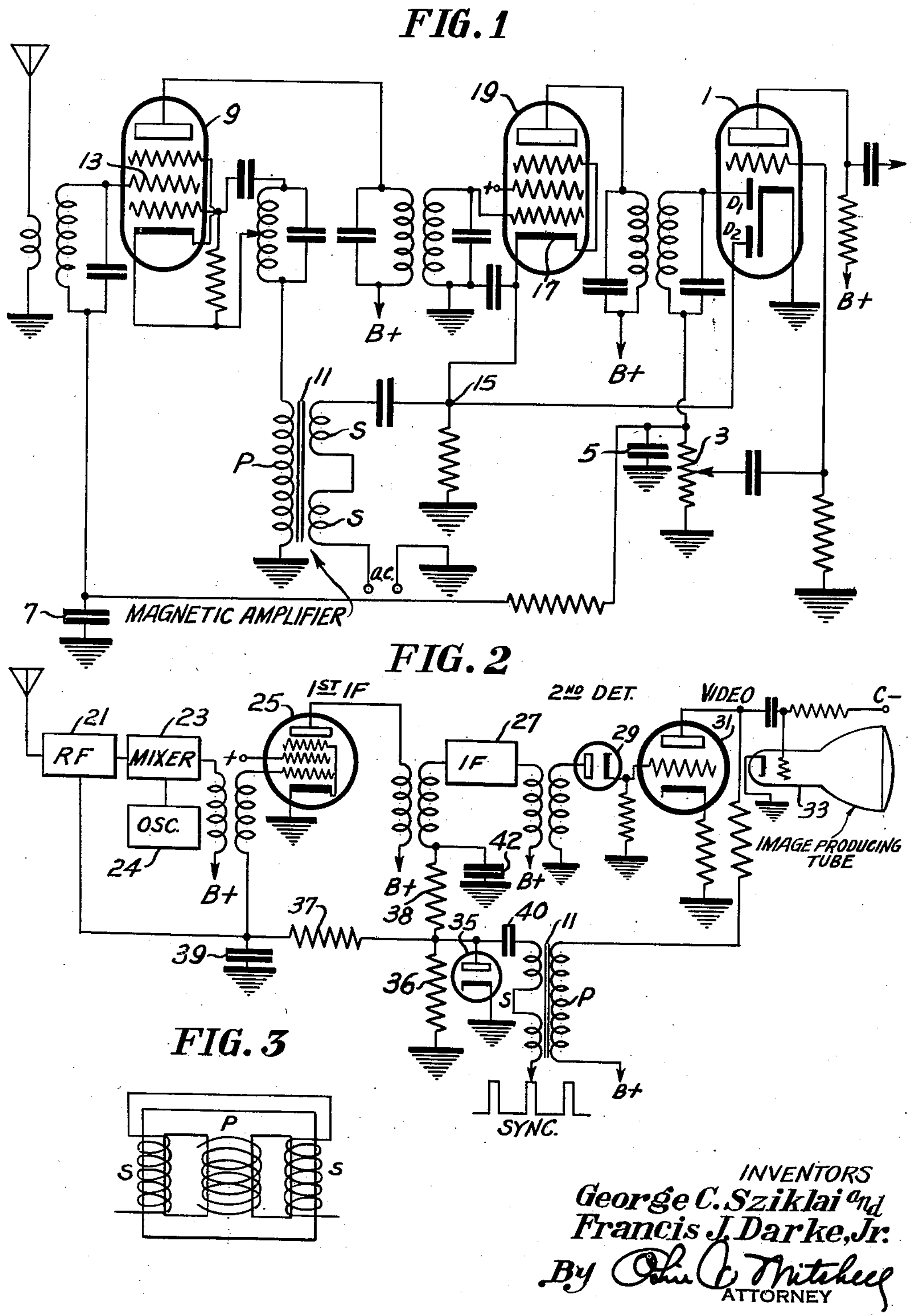
Figure 1 shows by circuit diagram one form of this invention.
Figure 2 shows by combination of block and circuit diagram another form of this invention.
Figure 3 shows schematically a magnetic amplifier transformer utilizing a saturating reactor.

Referring again but in more detail to Figure 1, there is shown a circuit arrangement including a convertor, I. F. amplifier, and second detector portion of a simple and conventional radio receiver which may be employed for the reception of sound signals, television signals, or composite signals including both sound and television signals. The signal carrier is detected by the second detector 1, and the detector voltage is then developed across load resistance 3, filtered in condensers 5 and 7 and applied to the control electrode 13 of the convertor tube 9. The changes in bias on the convertor tube 9 due to the change in the filtered detected voltage changes the current flowing through the primary P of the magnetic amplifier 11 in a manner which is conventional and well known to not only the television art, but the sound radio receiver art. In accordance with general practice, the change in bias on the convertor tube 9 will change its degree of amplification, but, more important in connection with the operation of this invention, it changes the impedance of the convertor tube 9, which results in a change in its current flow. Heretofore this change in current was not utilized to an advantage, but according to the present invention, the change in current flowing through convertor tube 9 can very advantageously be employed to control the saturation of a magnetic amplifier transformer 11.

The direction in which changes are made can be readily understood when it is appreciated that upon an increased signal level being applied to the second detector 1, an increased negative bias is applied to the control electrode 13 of tube 9. This causes a reduction in current flowing through tube 9 and hence primary P of the magnetic amplifier transformer 11. The converter tube 9 is thus a cathode output amplifier for the automatic gain control D.-C. voltage, providing a low impedance high current source for the magnetic amplifier 11 from the high impedance detector voltage appearing across capacitor 7. In accordance with magnetic amplifier theory, a reduction in primary D.-C. current permits a decreased transfer of an alternating current applied to the secondary S of magnetic amplifier 11, which is in turn rectified by diode $D_2$ which may be included in the same envelope as the diode $D_1$ to produce at terminal 15 an increased positive bias, which is in turn applied to cathode 17 of intermediate frequency amplifier tube 19.

Although a 60-cycle power supply is indicated as applied to the secondary S of the magnetic amplifier 11, any source of alternating current voltage may be applied. Furthermore, although diode $D_2$ of the second detector 1 is illustrated as a diode, any rectifier arrangement may be employed with the secondary S of magnetic amplifier 11.

It will be seen from the form of the invention illustrated in Figure 1 that there are only a few more resistors and condensers required in addition to a small magnetic amplifier transformer to provide automatic gain control considerably more satisfactory than can be achieved by any other known arrangement.

Turning now in more detail to Figure 2 there is shown a form of this invention as applied specifically to television receivers and the like. In its application to television receivers and the like, the practice of this invention has further advantages, in view of the fact that the magnetic amplifier 11 may be operated at the rate of the horizontal deflection, and the control may be applied to the magnetic amplifier 11 only from that portion of the signal which is occurring at the time of the peak of the synchronizing signal. Advantages such as were referred to above, in regard to reduction in noise interference, can be accomplished.

The signal from the transmitter is applied in the customary manner to an RF amplifier 21. The signal is then converted to the desired intermediate frequency by the mixer 23 and local oscillator 24. The signal is amplified in the intermediate frequency amplifier which includes, for purposes of example, tube 25 and block intermediate frequency amplifier 27. Block 27 may include one or more stages of intermediate frequency amplification.

The incoming signal is then detected in sound detector 29 and amplified in video amplifier 31 to be reproduced in image reproducing tube 33 in the usual manner. Appropriate R. F. amplifiers, mixers, intermediate frequency amplifiers, detectors, video amplifiers, and image reproducing tubes are well known in the art and need no detailed description here. An arrangement of components suitable for employment in the practice of this invention is well shown and described in an article entitled "Television Receiver" by Antony Wright, beginning on page 5 of the "RCA Review" for March 1947.

When the carrier signal increases in amplitude, the current in the video amplifier tube 31 also increases. In the form of the invention shown, the current of video amplifier tube 31 is passed through the primary P of magnetic amplifier transformer 11. This current flowing through primary P controls the reactance of magnetic amplifier transformer 11.

In the form of the invention shown in Figure 2, the alternating current applied to the secondary S of magnetic amplifier transformer 11 is obtained from the horizontal synchronizing pulses, as illustrated. It will therefore be seen that the magnetic amplifier transformer 11 will only function during the synchronizing pulse time, which, as explained above, amounts to approximately 8% of the total time. This provides a greater noise immunity for the automatic volume control, since the automatic volume control operates only during the time intervals of the synchronizing pulses, and any noise signals that may occur at any other time will not influence its action. This may be understood, considering that a voltage to be rectified by diode 35 is available only during the horizontal pulse time even though the secondary reactance is controlled continuously by the primary winding and tube 31.

The synchronizing pulses applied to automatic gain control detector 35 of the magnetic amplifier 11 will change in magnitude according to the current flowing through the primary P of the magnetic amplifier transformer 11, in accordance with the explanation above. The automatic gain controlled sync pulses flowing through the secondary S are then rectified by diode 35. The rectified voltage is then filtered by resistances 36, 37 and 38 and condensers 39, 40 and 42 to be applied as a bias control voltage in R. F. amplifier 21, mixer 23 and intermediate frequency amplifiers 25 and 27.

By means of this simple circuit arrangement, a fast or slow control may be obtained, and accordingly, even fast changes in volume level, such as caused by airplane interference and the like, may be compensated for due to the fact that the time constant of the circuit does not have to be made excessive for all conditions. Furthermore, since the automatic volume control or automatic gain control has a high gain in its feedback loop, the level applied to the second detector will be fairly constant, and therefore direct coupling to the video amplifier 31 is permitted and the usual D.-C. reinsertion is not required.

In another form of this invention, it is proposed to use one of the amplifiers previous to the second detector 29 as a D.-C. amplifier controlling the primary P of the magnetic amplifier transformer 11. However, such an arrangement is optional, and the circuit shown in Figure 2 would operate satisfactorily without necessitating further current amplification by one of the amplifiers, as shown in the form of the invention illustrated in Figure 1.

In the form of the invention shown in Figure 1, the reflex theory is employed because direct coupling is not employed. Direct coupling is not necessary with the audio type of receivers, and in order to have a higher current change in the primary P of the magnetic amplifier transformer 11, it is expedient to use the reflex arrangement shown.

Gains in direct current voltage as large as 140 times have been obtained with comparatively simple, economical and small magnetic amplifier transformers, and gains of this order can provide stability of the signal level of an order not approached heretofore.

Figure 3 shows in detail a suitable magnetic amplifier transformer designed for operation at 15,750 cycles, which is the horizontal deflection speed in a television receiver constructed to operate in accordance with present standards. Likewise, the primary winding P, which is in the center, consists of 700 turns of No. 38 wire, and the two secondaries S wound in such manner as to buck out any component transferred to them directly by the primary consist of 175 turns each of No. 32 wire, and the core material is Mu-metal or other readily saturating magnetic material. The size and construction of the transformer shown in Figure 3 are given by way of example only, and it is not intended that the practice of this invention should be limited thereto.

We claim:

1. A signal gain control system comprising in combination a magnetic amplifier utilizing a saturating reactor having a primary and a secondary winding, a signal receiving circuit including an amplifier tube for said signal, said amplifier tube having a gain control D.-C. grid bias connection, said signal receiving circuit arranged to receive an incoming signal, said amplifier tube having an output circuit, means for causing the magnitude of the direct current in said output circuit to be dependent upon the D.-C. grid bias, a rectifier, a source of direct current, and a source of alternating current, said source of direct current connected to said output circuit through said primary winding and said source of alternating current connected to said gain control connection through said secondary winding and said rectifier.

2. A signal gain control system comprising in combination a magnetic amplifier utilizing a saturating reactor having a primary and a secondary winding, said secondary winding split wound magnetically additive with respect to all its split sections and magnetically neutralized with respect to said primary winding, a radio receiving circuit including an amplifier arranged to receive an incoming signal, said amplifier having a signal gain control connection and having a direct current output circuit, means for causing the magnitude of the direct current in said output circuit to be dependent upon the incoming signal strength, a rectifier and filter, a source of direct current, and a source of alternating current, said source of direct current connected to said direct current output circuit through said primary winding and said source of alternating current connected to said gain control connection through said secondary winding and said rectifier and filter.

3. A signal gain control system for a radio receiving circuit arranged to receive an incoming signal, said radio receiving circuit having a gain control connection and having a direct current utilization circuit common to the signalling circuit, means for causing the magnitude of the direct current used by said utilization circuit to be dependent upon the incoming signal strength, said signal gain control system comprising in combination a magnetic amplifier utilizing a saturating reactor having a pair of coupled windings, a source of direct current, and a source of alternating current, a rectifier, said source of direct current connected to said direct current utilization circuit through one of said windings and said source of alternating current connected to said gain control connection through the other of said windings and said rectifier.

4. A signal gain control system comprising in combination a magnetic amplifier utilizing a saturating reactor having a primary and a secondary winding, a signal receiving circuit having a gain control connection, said signal receiving circuit arranged to receive an incoming signal and having an amplifier tube for said signal, said tube also arranged to utilize direct current, means for causing the magnitude of the direct current utilized by said tube to be dependent upon the incoming signal strength, a source of direct current, a source of alternating current, a rectifier, said source of direct current connected to said tube through said primary winding, and said source of alternating current connected to said gain control connection through said secondary winding and said rectifier.

5. A signal gain control system for a television receiving station including a television signal receiving circuit having a television signal amplifier arranged to receive an incoming television signal said amplifier having a signal gain control connection, said television signal receiving circuit having a direct current utilization circuit common to a circuit for said television signal, means for causing the magnitude of the direct current utilized by said circuit to be dependent upon the incoming signal strength, said signal gain control system comprising in combination a magnetic amplifier utilizing a saturating reactor having a primary and a secondary winding, a rectifier circuit, a source of direct current, and a source of synchronizing pulses, said source of direct current connected to said direct current utilization circuit through said primary winding, and said source of synchronizing pulses connected to said gain control connection through said secondary winding and said rectifier circuit, said rectifier circuit being so poled that the application of said synchronizing pulses causes energization of a storage circuit connected to said gain control connection to compensate for variations in the level of said synchronizing signals.

GEORGE C. SZIKLAI.
FRANCIS J. DARKE, Jr.

REFERENCES CITED

The following references are of record in the file of this patent:

UNITED STATES PATENTS

| Number | Name | Date |
|---|---|---|
| 1,953,487 | Knoop | Apr. 13, 1934 |
| 2,085,927 | Sorensen | July 6, 1937 |
| 2,104,087 | Linsell | Jan. 4, 1938 |
| 2,164,383 | Burton | July 4, 1939 |
| 2,217,948 | Harnett et al. | Oct. 15, 1940 |
| 2,229,952 | Whitely et al. | Jan. 28, 1941 |
| 2,251,929 | Freeman et al. | Aug. 12, 1941 |
| 2,259,711 | Stevens et al. | Oct. 21, 1941 |
| 2,339,406 | Holden | Jan. 18, 1944 |

FOREIGN PATENTS

| Number | Country | Date |
|---|---|---|
| 473,512 | Great Britain | Oct. 14, 1937 |
| 862,360 | France | Mar. 5, 1941 |